J. H. STICKEL.
COMBINED CHECK AND GATE VALVE.
APPLICATION FILED FEB. 12, 1910.
961,738.
Patented June 14, 1910.
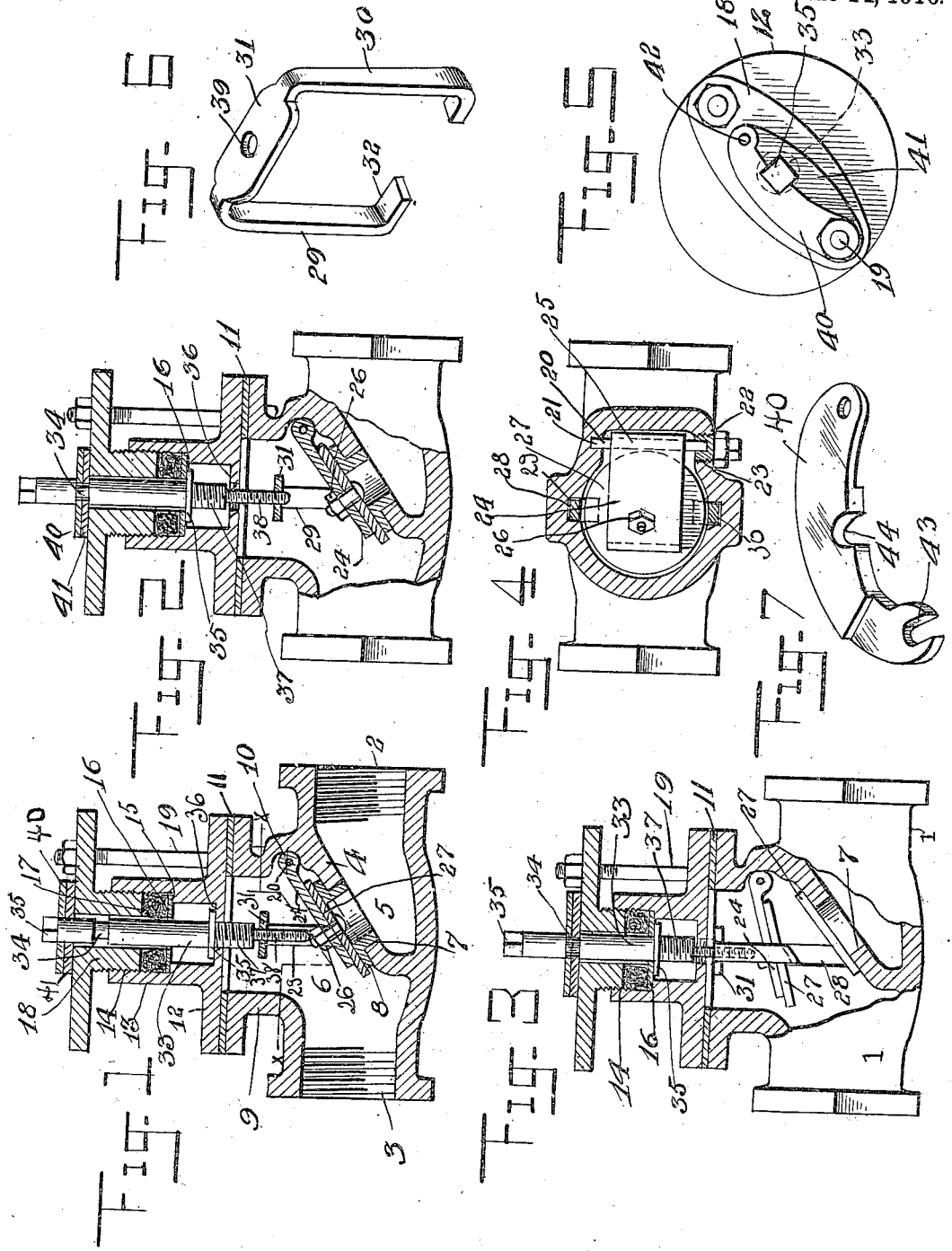
WITNESSES
INVENTOR
J. H. STICKEL
ATTORNEYS.

UNITED STATES PATENT OFFICE.

JOHN H. STICKEL, OF HANDY HARRISVILLE STATION, PENNSYLVANIA.

COMBINED CHECK AND GATE VALVE.

961,738. Specification of Letters Patent. Patented June 14, 1910.

Application filed February 12, 1910. Serial No. 543,622.

*To all whom it may concern:*

Be it known that I, JOHN H. STICKEL, a citizen of the United States of America, residing at Handy Harrisville Station, in the county of Butler and State of Pennsylvania, have invented certain new and useful Improvements in Combined Check and Gate Valves, of which the following is a specification, reference being had therein to the accompanying drawing.

This invention relates to valves, more particularly to a combined check and gate valve, and the object thereof is to provide a construction of valve in a manner as hereinafter set forth which when occasion so requires can be either used as a check valve or a gate and furthermore provided with means in a manner as hereinafter set forth for locking the gate in a closed position and also in an elevated position when occasion so requires.

Further objects of the invention are to provide a combined check and gate valve which shall be simple in its construction and arrangement, strong, durable, efficient in its use, readily set up and comparatively inexpensive to manufacture.

With the foregoing and other objects in view the invention consists in the novel construction, combination and arrangement of parts as hereinafter more specifically described and illustrated in the accompanying drawings, wherein is shown the preferred embodiment of the invention, but it is to be understood that changes, variations, and modifications can be resorted to which come within the scope of the claims hereunto appended.

In the drawings wherein like reference characters denote corresponding parts throughout the several views,—Figure 1 is a vertical sectional view of a valve in accordance with this invention, the gate being locked in a closed position, Fig. 2 is a like view with the gate in a position to be used as a check valve, Fig. 3 is a sectional elevation with the gate locked in an elevated position, Fig. 4 is a horizontal sectional view of the valve, on the line X—X of Fig. 1, Fig. 5 is a plan of the same showing the lock for securing the valve stem in an elevated position, Fig. 6 is a perspective view of a stirrup, and Fig. 7 is a perspective view illustrating one of the elements of the lock.

Referring to the drawings in detail, 1 denotes a valve casing provided with an inlet 2 and an outlet 3. The casing 1 is furthermore provided with an inclined partition 4 for dividing the interior of the casing 1 into an inlet chamber 5 and an outlet chamber 6. The partition 4 is formed with an opening 7 for establishing communication between the chambers 5 and 6 and seated in said opening 7 and mounted against one face of the partition 4 is the flanged bushing 8 which constitutes a valve seat. The valve casing 1 is formed with a tubular extension 9 which opens into the chamber 6 and said extension at its junction with the partition 4 is cut away to provide a bearing 10 for a purpose to be presently referred to.

The extension 9 has mounted thereon a washer 11 and seated against said washer and secured to the extension 9 is a cap 12 having a tubular extension 13 which is interiorly threaded as at 14 and formed with a shoulder 15 against which is seated a disk 16 for supporting a packing 17 which is engaged by a gland 18 coupled with the extension 9 by a plurality of hold-fast devices, which is indicated by the reference character 19.

Extending transversely of the tubular extension 9 is a bar 20 having one end 21 extending in the inner face of said extension and its other end connected to a plug 22 which engages in the screw-threaded opening 23 formed in the extension 9. Arranged in the chamber 6 is a valvular member in the form of a gate and which consists of a rectangular plate 24 enlarged at one end as at 25 and having the enlarged end thereof pivotally-mounted upon the bar 20 and engaging the bearing 10. Secured to the lower face of the plate 24 by the hold-fast device 26 is a seating disk 27 which projects from the plate 24 and is adapted to engage the seat 8. The disk 27 is also of greater diameter than the flanged portion of the bushing 8, and furthermore is of a diameter as to extend in proximity to the wall of the chamber 6.

The wall of the tubular extension 9 is formed with a pair of diametrically opposed guide ways 28 for the arms 29, 30 of a vertically movable yoke 31. The lower terminus of each of the arms 29, 30 is bent in an angular manner as at 32 so as to project toward each other and the said angular ends 32 extend below the seating disk 27 as indicated in dotted lines, Fig. 4, so that when the yoke 31 is elevated the end 32 will shift the valvular member and retain it elevated in a manner as shown in Fig. 3.

Extending through the cap 12 and into the tubular extension 9 as well as into the chamber 6 is a valve stem comprising a body portion 33 formed near its upper end with an annular groove 34 and having its outer terminus squared as at 35 for the reception of a suitable tool. The inner terminus of the body portion is formed with an integral flange 35 to limit the outward and inward movement of the stem, the said flange on the outward movement of the stem engaging the disk 16 and on its inward movement engaging a flange 36 which forms a part of the cap 12 and has the edge screw-threaded. Projecting from the inner terminus of the body portion 33 is a screw-threaded extension 37 which engages with the threads of the flange 36 for retaining the stem in an adjusted position. Formed integral with the extension 37 is a reduced screw-threaded protuberance 38 which engages with a screw-threaded opening 39 formed in the yoke 31 and which is adapted to elevate or lower said yoke 31. The protuberance 38 is furthermore adapted to engage the hold-fast device 26 and maintain the valvular element closed as clearly shown in Fig. 1.

Mounted upon the gland 18 is a lock which is adapted to extend into the groove 34 and maintain the valve stem and also the valve in an elevated position as clearly shown in Fig. 3. The lock consists of a pair of sections 40 and 41 mounted at one end upon a pivot 42 carried by the gland 18. The sections 40, 41 are mounted one upon the other as clearly shown in Fig. 5 and the outer end of each section is slotted as at 43 to engage around one of the hold-fast devices 19. Each of the sections 40, 41 is recessed as at 44 to receive the reduced end of the valve stem formed by the groove 34 so that when said reduced end extends in the recesses 44 the valve stem will be maintained in an elevated position. When the hold-fast device 19 is loosened the slotted ends 43 of the sections 40, 41 can be moved from engagement with the valve stem and the latter can then be lowered.

When the parts are in the position as shown in Fig. 1, the valve is maintained closed owing to the engagement of the element 38 with the element 26. By screwing the stem 33 counter-clockwise the threaded portion 37 will clear the threads of the flange 36 while the reduced screw-threaded protuberances 38 will move upwardly through the upper transverse portion of the yoke 31 as shown in Fig. 2 and in order to elevate the yoke so as to open the valve as shown in Fig. 3, it is necessary to turn the steam in the reverse direction or clock-wise.

What I claim is:

1. A combined check and gate valve comprising a casing provided with a valve seat, a valvular element embodying a hinged plate and a seating disk of a diameter as to project beyond said plate and adapted to engage said valve seat, a valve stem provided with means for locking said valvular element upon its seat, and means coöperating with the valve stem and engaging said seating disk for elevating said valvular element, and means for maintaining the valvular element in an elevated position.

2. A combined check and gate valve comprising a valve casing provided with a valve seat, a valvular element embodying a hinged plate and a seating disk engaging said seat, means for limiting the opening movement of said valvular element, a vertically-movable yoke coöperating with said means for elevating said valvular element, and a lock engaging the said means for maintaining said valvular element in an elevated position.

3. A combined check and gate valve comprising a valve casing provided with a valve seat, a valvular element embodying a hinged plate and a seating disk engaging said seat, means for limiting the opening movement of said valvular element, and a vertically-movable yoke coöperating with said means for elevating said valvular element.

4. A combined check and gate valve comprising a valve casing provided with a valve seat, a valvular element embodying a plate and a seating disk connected therewith, means for hinging said plate within said casing, means for locking said valvular element against said seat, and a yoke associating with said means for elevating and retaining said valvular element in an elevated position.

5. A combined check and gate valve comprising a valve casing provided with a valve seat, a valvular element embodying a plate and a seating disk connected therewith, means for hinging said plate within said casing, means for locking said valvular element against said seat, a vertically-movable yoke associating with said means for elevating said valvular element, and means arranged exteriorly of the casing engaging with said means for maintaining the valvular element elevated.

6. A combined check and gate valve comprising a valve casing provided with a valve seat, a hinged valvular element having an enlarged seating disk, an adjustable valve stem for locking said disk against said seat and further adapted to limit the opening movement of said valvular element, and means associating with said valve stem for elevating said valvular element off its seat.

7. A combined check and gate valve comprising a valve casing provided with a valve seat, a hinged valvular element having an enlarged seating disk, an adjustable valve stem for locking said disk against said seat and further adapted to limit the opening movement of said valvular element, means associating with said valve stem for elevating said valvular element off its seat, and means exteriorly of said casing and engaging with the valve stem for maintaining said element in elevated position.

In testimony whereof I affix my signature in the presence of two witnesses.

JOHN H. STICKEL.

Witnesses:
J. H. PIZOR,
J. G. MCCLYMONDS.